Sept. 15, 1936.  M. FLEISCHER  2,054,414

ART OF MAKING MOTION PICTURE CARTOONS

Filed Nov. 2, 1933

INVENTOR
MAX FLEISCHER
BY
Kiddle, Margem & Homidge
ATTORNEYS

Patented Sept. 15, 1936

2,054,414

UNITED STATES PATENT OFFICE 2,054,414

ART OF MAKING MOTION PICTURE CARTOONS

Max Fleischer, New York, N. Y.

Application November 2, 1933, Serial No. 696,312

23 Claims. (Cl. 88—16)

This invention relates to improvements in the art of making motion picture cartoons, and is particularly directed to a method and apparatus whereby the cartoon is made to appear more natural and realistic.

The term motion picture cartoon is employed in the broad sense and as including motion pictures of animated drawings or pictures of any description. These involve the production of a series of successive drawings or pictures, depicting the object whether animate or inanimate in successive positions it occupies in the course of the picture as a whole. These pictures are photographed in succession upon a motion picture film. The subject of these drawings or pictures may be of any kind or description.

In the present practice of making motion picture cartoons the foreground characters or objects are drawn on a transparent medium such as a celluloid sheet or sheets and the entire background is usually drawn on a single sheet, although sometimes the background may be a composite made up of several sheets, those superimposed being transparent. The foreground sheet or sheets are superimposed on the background sheet or sheets in close contact, and the composite picture made up of these various layers of sheets is photographed in close contact.

Cartoons made according to present practices depend for their illusion of distance on the manner in which the background is drawn or painted by the use of the commonly known perspective rules and regulations and although this indicates distance to the observer, it does not actually give the observer a sense of true distance. This same fault is apparent in animated cartoons with respect to the relation of the character or action to the background, and between various portions of background that are intended to be at different distances from the eye of the observer notwithstanding the skill employed in making the drawings, and the flatness of these cartoons gives them an artificial character that to a large degree impairs their effectiveness.

In the cartoon of today it is frequently necessary to depict close-up views and distant views as well as views giving the illusion of the observer approaching, and in other cases, receding from the action and background. Each such change in the apparent position of the observer produces a change in perspective and consequently relative changes in the component parts of the composite picture with relation to each other. These changes which must be depicted to secure realistic effects are wholly lacking in the present methods of making cartoons and are only possible by those methods by making innumerable additional drawings, the cost of which would be prohibitive.

Panoramic effects, viz., those giving the illusion of motion across a background scene, also are frequently employed. Near objects appear to travel past the eye of the observer more rapidly than more distant objects and the relative position of near and more distant objects constantly change as they pass the eye. These changes must be depicted in order to obtain realistic effects, but here again the limitation of present methods are such as to make these effects impossible except at prohibitive cost.

The present methods of making cartoons are also severely handicapped in securing proper relative illumination of action and background and various portions of the background, independent illumination being impossible or impractical, and to secure contrasting illumination dependence is almost entirely placed upon the drawings themselves. Illumination is usually obtained by transmitting light through the several celluloid sheets to the opaque background sheet. It is difficult to properly illuminate the background without over-exposing the foreground as the light received by the background must come through the layers of celluloid sheets which absorb a large part of the light. Attempts have also been made to illuminate the background from the rear but this seems only to give silhouettes of the background and the front light which must pass through the layers of foreground sheets with the consequent absorption must be relied upon to illuminate the details of the background, and hence this method has not been satisfactory, unless the backgrounds have been previously prepared to act as a transparency, but even in this case the artist can take no liberties in the background by way of changes or alterations and it will also usually be found that the finished result will show a marked difference in photographic texture of the transparency and the interposed foreground object which gives an undesirable artificial effect.

My invention permits the realization of all the effects hereinabove noted, lacking in present cartoons, and in addition many novel effects.

According to my invention, the drawings or objects of the foreground and of all objects in or constituting the background are each accorded their respective places in the field of vision, separated one from the other with regard to the respective distances they are intended to be from the eye of the observer, represented by the lens of the camera.

It is an object of this invention in accomplishing the effects hereinbefore mentioned to draw the objects of the background on separate supports and to arrange these supports in different vertical planes one behind the other in their respective positions in the field of the camera. When the camera is moved toward or away from the drawings, arranged as indicated, during the photographing operation and the film thus produced is projected, the objects of the background will appear to stand out in bas-relief and to move or change in perspective, thereby producing a more natural and realistic picture.

Another object of my invention resides in the arrangement of these drawings of the objects of the background on a movable bed or platform for the making of panoramic pictures, whereby the objects will be moved at different speeds about a common pivot resulting in a more natural and realistic picture when a film thus produced is projected.

A further object of my invention resides in the provision of reflective illumination of the background independent of the foreground illumination. This is of considerable advantage inasmuch as the illumination of the background can be intensified so as to compensate for loss of light passing from the background through the foreground celluloid sheets to the camera lens, without subjecting the foreground images to this intensified light which would over-expose them. Under the present practice the light cannot be increased to better illuminate the background as this would result in over-exposure of the foreground cartoon figure.

A still further object of the invention is the provision of light wheels adjacent the foreground or background lights whereby the illumination or coloring of the foreground or background or both may be varied at will to produce different effects without the necessity of making additional drawings. For instance, under the present practice if it is desired to illustrate a change of lighting effects in the background as well as the foreground as, for instance, the rising or setting of the sun or the change of colors from light to dark or from bright sunlight effects to blue moonlight effects, it is necessary to draw a separate series of pictures, whereas with my improved method the same drawing can be employed for this purpose, it merely being necessary to regulate or alter the color of the source of illumination as will be more fully explained hereinafter.

For carrying out my improved method I have designed an apparatus comprising a table or stand having a camera mounted thereon for longitudinal movement and a support or bed to receive a foreground drawing or drawings on a transparent medium such as celluloid. To the rear of this foreground drawing support I provide a bed for a series of drawings of background objects each on separate cards and being spaced from the foreground and from one another suitable distances to give the correct perspective. For example, the furthest background from the camera might represent the sky, the next intermediate background might represent mountains, the next trees, and the next rocks. The relative sizes of these objects should be in conformity with a correct perspective, means for determining this being well known.

In the making of panoramic pictures I employ an oscillatable bed or platform for the drawings of the background objects. This platform is pivoted at a point remote from the camera and preferably in the line of the optical axis of the lens of the camera, so that when the bed is moved about its pivot the various objects will move at different relative speeds. For example, the background representing the sky, due to the fact that it is closer to the pivot, will take longer to traverse the field of the camera than the intermediate backgrounds as will be obvious.

Further objects and advantages of my invention will be manifest from the following detailed description and the accompanying drawing, in which drawing.

Figure 1:
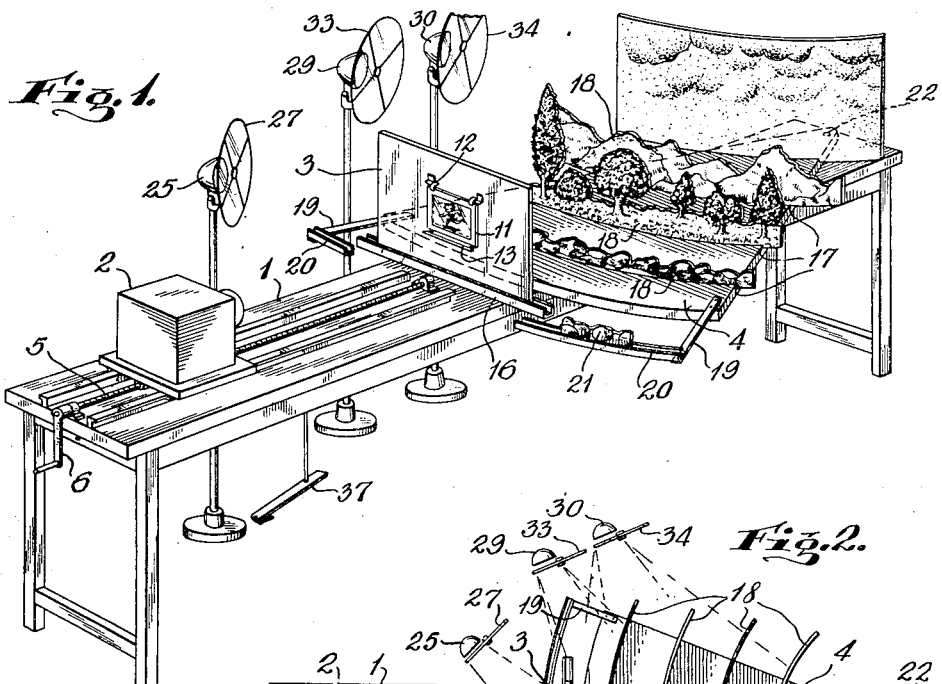
Fig. 1 is a perspective view of a structure for carrying out my improved invention.
Figure 2:
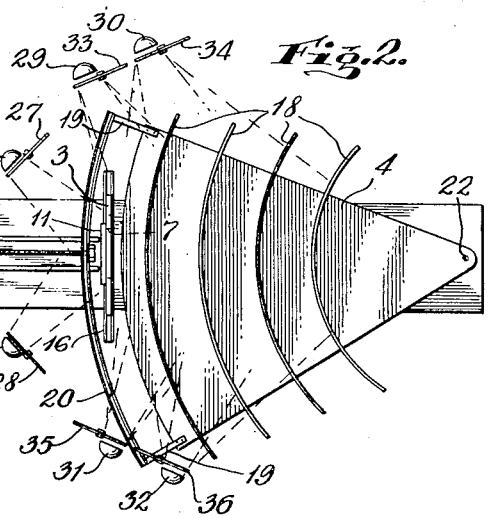
Fig. 2 is a plan view of the same.
Figure 3:
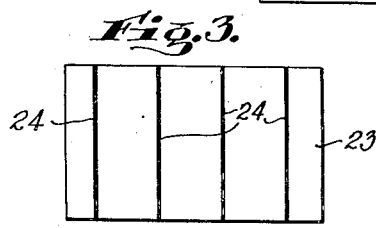
Fig. 3 is a plan view of a stationary background platform.

Referring to the drawing in detail, 1 represents a table or support for a camera 2, a vertically extending bed 3 and a horizontal platform 4. This support is provided with a screw shaft 5 extending longitudinally thereof which may be rotated by means of the handle 6. The camera is provided with a threaded connection to the screw shaft 5 whereby upon rotation of the shaft the camera may be moved toward and away from the bed 3.

The bed 3 is provided with a glass window 7 above which are the usual pins 8 for receiving a celluloid sheet 9 which is provided with holes 10 whereby the sheet may be removably supported adjacent the window 7. The sheet 9 as will be understood bears a drawing of a cartoon character or other foreground objects and as hereinbefore mentioned a number of such sheets may be employed.

The bed 3 also supports a window frame 11 attached thereto at 12. This frame is provided with a handle 13 adjacent its lower edge whereby the same may be raised and lowered about its pivot 12 to give access to the sheets 9 when changing the same. Adjacent the handle 13 are a pair of hooks 14 adapted to engage a bar 15 for locking or clamping the frame down on the sheets 9 to securely hold the same between the glass in the frame 11 and the glass 7.

In cases where the foreground images are shown in motion, one or more of the foreground sheets are changed each time the camera is operated to produce animation as is well known in this art. In this connection when the camera is close to the bed 3 obviously it would be inconvenient if the camera were moved away from the bed by the operator each time in replacing the celluloid sheets 9 as the camera would continually have to be refocussed, resulting in a loss of time. I have therefore provided means in the form of a channel 16 whereby the bed can be moved transversely of the support for this purpose. It will be understood that while I have illustrated and described a channel for this purpose various other forms may be employed, for example, the bed 3 may be pivoted on the support 1 whereby it may be swung outwardly of the support.

The platform 4 mounted on the support 1 to the rear of the bed 3 is provided with a plurality of grooves 17 spaced from each other longitudinally of the support for receiving separate drawings 18 of the various objects of the background in different vertical planes. This platform may also be provided with a pair of radially extending arms 19 projecting beyond the bed 3 and connected by an arcuate channel 20. When desired to depict a scene in front of the foreground a drawing 21 of such scene may be supported in this channel. In the form illustrated in Fig. 1 this platform is pivoted at 22 whereby the same may be moved intermittently across the field of the camera with the intermittent operation of the camera in the taking of panoramic views. It will be appreciated that a film made in this manner, when projected, will depict the various objects of the background moving in proper perspective and at proper relative speeds.

When it is desired to take pictures other than panoramic a platform 23 may be substituted if desired for the platform 4 and secured to the support 1 in any suitable manner. This platform 23 is also provided with spaced grooves 24 corresponding to the grooves 17 in the platform 4. In this platform, however, the grooves are not curved.

It is to be understood that while I have illustrated and described grooves for supporting the drawings in the platform I do not wish to be limited to this form of support inasmuch as various other means of support may be employed. In fact the grooves may be eliminated entirely and the drawings fastened to the support in their respective positions by means of adhesive tape for example.

In order to properly illuminate the foreground, that is, the celluloid sheet 9 and the drawing in the channel 20 if one is employed, I provide foreground lamps 25 and 26, the rays of which are directed on the sheet or the window in the frame 11. Adjacent these lights I provide light wheels 27 and 28 respectively having colored discs, these wheels being rotatable whereby any desired color may be thrown on the foreground.

I have also provided independent reflective illumination for the background in the form of lights 29, 30, 31 and 32 respectively, the rays from these lights being directed upon the front of the various objects of the background. Adjacent these lights also I provide rotatable light wheels 33, 34, 35 and 36 respectively similar to the light wheels 27 and 28. By employing these light wheels I am enabled to use the same drawings when depicting the changing of lighting effects such as, for instance, the rising or setting of the sun or a change of colors from light to dark or from bright sunlight to blue moonlight effects. This is accomplished by merely rotating the wheels to regulate or alter the color of the light thrown on the drawings. In the former practice, as heretofore mentioned, it was necessary to make a separate series of drawings for this purpose.

Figures 4, 5, 6:
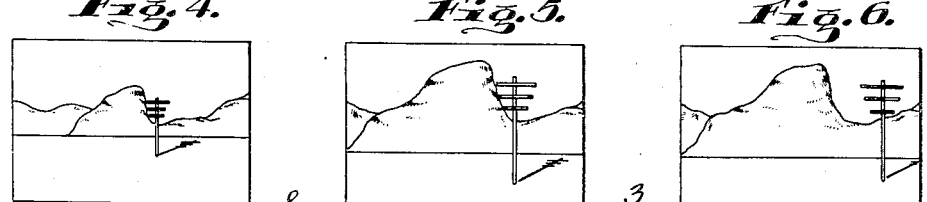
Fig. 4 illustrates a background.
Fig. 5 is a close-up of the background of Fig. 4 under the present method.
Fig. 6 is a close-up of the same background under my improved method.
Figure 7:
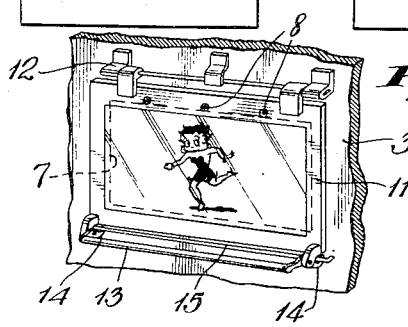
Fig. 7 is an enlarged view of the foreground support.
Figure 8:
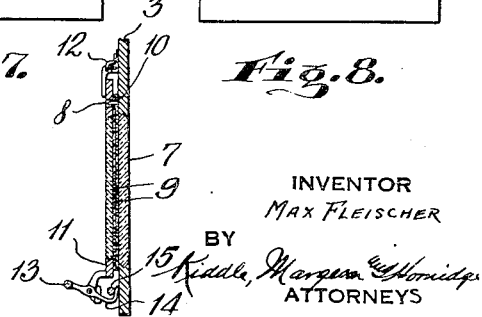
Fig. 8 is a sectional view of the same.

In carrying out my improved method a cartoon character is drawn on a sheet of transparent material such as celluloid and placed on the pins 8 and clamped between the glass of the frame 11 and the glass 7. The various objects of the background are drawn on separate supports and placed on the platform 4 in different vertical planes and when desired to depict the scene in front of the foreground the same is drawn on a separate support and placed in the channel 20. The camera 2 is then focussed and a series of pictures of the successive phases of action taken in the usual manner, a pedal 37 for operating the camera being conveniently located adjacent the operator's station. When it is desired, for example, to show the picture approaching, the camera is moved toward the bed 3 by rotation of the shaft 5 by means of the handle 6 and successive pictures taken during the advance of the camera. Upon the projection of a picture taken in this manner it will be obvious that the various objects will change in perspective. For example, assuming that it is desired to take a picture of the mountain and telegraph pole as illustrated in Fig. 4; under the former method a close-up of this picture would be as illustrated in Fig. 5. Here it will be noted that the cross bars of the telegraph pole appear to touch the side of the mountain as in the distant picture (Fig. 4), the mountain and the telegraph pole not having changed in perspective. With my improved method, however, in taking the picture as illustrated in Fig. 4 a close-up would be as illustrated in Fig. 6, the telegraph pole and mountain having changed in perspective due to the fact that the drawings of the mountain and the telegraph pole are in different planes, that is, different distances from the camera, and separated a proper distance to produce a realistic effect.

When taking a panoramic picture the platform 4 is moved about its pivot intermittently with the intermittent operation of the camera. As the platform 4 is so moved it will be obvious that the drawing on the support adjacent the pivot and hence most remote from the camera will move across the field of the camera slower than the intermediate drawings, each drawing as will be appreciated moving at a speed corresponding to its distance from the pivot point. When a film thus made is projected it will be obvious that the various objects of the background will appear to change their perspective and will show relative speeds as in real life.

It is to be understood that the drawing accompanying this application is merely illustrative and various modifications and changes may be made in the structure shown without departing from the spirit and scope of this invention.

What I claim is:

1. The method of making motion picture cartoons, which includes successively photographing a series of cartoon drawings placed one at a time in the field of the camera as one component with a plurality of miniature scene objects spaced apart linearly of the camera as other components, changing the cartoon drawings between exposures to give the effect of animation to a figure shown on the cartoon drawings, and changing the relative position of the camera and said components between exposures to give a changing perspective effect.

2. The method of making motion picture cartoons, which includes successively photographing a series of cartoon drawings placed one at a time in the field of the camera as one component with a plurality of miniature scene objects spaced apart linearly of the camera as other components, changing the cartoon drawings between exposures to give the effect of animation to a figure shown on the cartoon drawings, and moving the camera between exposures on a straight line coinciding with the axis of the lens of the camera to give a changing perspective effect.

3. The method of producing motion picture cartoons, which includes positioning a representation of a cartoon figure as one component in front of a plurality of miniature scene objects disposed in spaced relation, one behind the other, as other components, positioning a camera forwardly of said components, making a plurality of successive photographic exposures with said camera, changing the appearance of the first mentioned component between two of said exposures and moving said miniature scene objects between two of said exposures laterally in the same direction at different rates of progression, thereby changing their relative position as viewed by the camera to give a laterally changing perspective effect.

4. The method of making motion picture cartoons, which includes successively photographing a series of cartoon drawings placed one at a time in the field of the camera as one component with a plurality of miniature scene objects spaced apart linearly of the camera as other components, changing the cartoon drawings between exposures to give the effect of animation to a figure shown on the cartoon drawings, and moving said miniature scene objects between exposures laterally in the same direction at different rates of progression, thereby changing their relative position as viewed by the camera to give a laterally changing perspective effect.

5. The method of producing motion picture cartoons, which includes positioning a representation of a cartoon figure as one component in front of a plurality of miniature scene objects disposed in spaced relation, one behind the other, as other components, positioning a camera forwardly of said components, making a plurality of successive photographic exposures with said camera, changing the appearance of the first mentioned component between two of said exposures, moving said miniature scene objects between two of said exposures laterally in the same direction at different rates of progression, thereby changing their relative position as viewed by the camera to give a laterally changing perspective effect, and changing the distance between said camera and said components between two of said exposures, thereby changing the relative size and position of said miniature scene objects as viewed by the camera to give a linearly changing perspective effect.

6. The method of making motion picture cartoons, which includes successively photographing a series of cartoon drawings placed one at a time in the field of the camera as one component with a plurality of miniature scene objects spaced apart linearly of the camera as other components, changing the cartoon drawings between exposures during the photography to give the effect of animation to a figure shown on the cartoon drawings, moving said miniature scene objects between exposures laterally in the same direction at different rates of progression, thereby changing their relative position as viewed by the camera to give a laterally changing perspective effect, and changing the relative position of the camera and said components between exposures to give a linearly changing perspective effect.

7. The method of making motion picture cartoons which includes positioning one of a series of cartoon drawings in the field of a camera as one component and arranging a plurality of miniature scene objects in spaced relation linearly of the camera as other components, photographing said components, changing the drawing and at the same time changing the relative positions of the camera and said components to give a different perspective effect, and again photographing the components.

8. The method of making motion picture cartoons which includes positioning one of a series of cartoon drawings in the field of a camera as one component and arranging a plurality of miniature scene objects in spaced relation linearly of the camera as other components, photographing said components, changing the drawing and at the same time moving the camera on a straight line coinciding with the axis of the lens of the camera to give a different perspective effect; and again photographing the components.

9. The method of making motion picture cartoons which includes positioning one of a series of cartoon drawings in the field of a camera as one component and arranging a plurality of miniature scene objects in spaced relation linearly of the camera as other components, photographing said components, changing the drawing and at the same time moving said miniature scene objects laterally in the same direction at different rates of progression to give a different perspective effect, and again photographing the components.

10. The method of making motion picture cartoons which includes positioning one of a series of cartoon drawings in the field of a camera as one component and arranging a plurality of miniature scene objects in spaced relation linearly of the camera as other components, photographing said components, changing the drawing and at the same time moving said miniature scene objects laterally in the same direction at different rates of progression and changing the distance between the camera and said components to give a different perspective effect, and again photographing the components.

11. The method of making motion picture cartoons which includes positioning one of a series of cartoon drawings in the field of a camera as one component and arranging a plurality of miniature scene objects in spaced relation linearly of the camera as other components, photographing said components, changing the drawing and photographing said components, changing the relative positions of the camera and said components to give a different perspective effect, and again photographing the components.

12. The method of making motion picture cartoons which includes positioning one of a series of cartoon drawings in the field of a camera as one component and arranging a plurality of miniature scene objects in spaced relation linearly of the camera as other components, photographing said components, changing the drawing and photographing said components, moving the camera on a straight line coinciding with the axis of the lens of the camera to give a different perspective effect, and again photographing the components.

13. The method of making motion picture cartoons which includes positioning one of a series of cartoon drawings in the field of a camera as one component and arranging a plurality of miniature scene objects in spaced relation linearly of the camera as other components, photographing said components, changing the drawing and photographing said components, moving said miniature scene objects laterally in the same direction at different rates of progression, to give a different perspective effect, and again photographing the components.

14. The method of making motion picture cartoons which includes positioning one of a series of cartoon drawings in the field of a camera as one component and arranging a plurality of miniature scene objects in spaced relation linearly of the camera as other components, photographing said components, changing the drawing and photographing said components, moving said miniature scene objects laterally in the same direction at different rates of progression and changing the distance between the camera and said components to give a different perspective effect, and again photographing the components.

15. In motion picture cartoon photography, the combination with a camera, of a plurality of miniature scene objects, a frame, and a cartoon drawing held in said frame, said objects and frame being spaced apart linearly of the camera, means for supporting and maintaining said objects and frame in such spaced relationship, means for supporting said camera, and means for moving and guiding said camera linearly toward and from said objects.

16. In motion picture cartoon photography, the combination with a camera, of a plurality of miniature scene objects spaced apart linearly of the camera, means for supporting and maintaining said objects rigidly in such spaced relationship, means for supporting said camera, means for moving and guiding said camera linearly toward and from said objects and a frame positioned in front of said objects and between the same and said camera for supporting a cartoon drawing, and means for supporting said frame in said position.

17. In motion picture cartoon photography, the combination with a camera, of a plurality of miniature scene objects spaced apart linearly of the camera, means for supporting and maintaining said objects in such spaced relationship and for moving the same laterally in progressive steps in the same direction at different rates of progression substantial distances across the field of the camera, means for supporting said camera, and means for moving the camera along said support, and means for guiding said camera in a straight line toward and from said objects.

18. In motion picture cartoon photography, the combination with a camera, of a plurality of miniature scene objects disposed in the field of the camera and spaced apart linearly of the camera, pivoted means supporting and maintaining said objects and for moving the same laterally in the same direction across the field of the camera at different rates of progression and a frame positioned in front of said objects and between the same and said camera for supporting different drawings of a series of cartoon drawings in succession in the field of the camera with said scene objects, and means for supporting said frame in said position.

19. In motion picture cartoon photography, the combination with a camera, of a plurality of miniature scene objects spaced apart linearly of the camera, pivoted means for supporting and maintaining said objects in such spaced relationship and for moving the same laterally in the same direction at different rates of progression across the field of the camera, supporting means for said camera, means for moving and guiding said camera in a straight line toward and from said objects, a frame disposed in laterally immovable fixed relation to the camera for supporting a cartoon drawing, and means for supporting said frame in front of said objects and between the same and said camera.

20. In motion picture cartoon photography, the combination with a camera, of a frame disposed in front of said camera for supporting one or more cartoon drawings, a plurality of miniature scene objects spaced apart linearly of the camera behind said frame in the field of the camera, and a platform supporting said objects and mounted to swing on a vertical axis to move said objects laterally in progressive steps at different rates of progression.

21. In motion picture cartoon photography, the combination with a camera, of a plurality of scene objects spaced apart linearly of the camera, means including a platform for supporting said objects and for moving the same laterally in progressive steps at different rates of progression in the same direction substantially entirely across the field of the camera and a frame positioned in front of said objects and between the same and said camera to support different drawings of a series of cartoon drawings in succession in the field of the camera with said objects and means for supporting said frame in said position.

22. In motion picture cartoon photography, the combination with a camera, of a plurality of miniature scene objects spaced apart linearly of the camera, means including a platform for supporting said objects and for moving the same laterally in progressive steps at different rates of progression in the same direction substantially entirely across the field of the camera and a frame positioned in front of said objects and between the same and said camera adapted to hold different drawings of a series of cartoon drawings in succession in the field of the camera with said objects and means for supporting said frame in said position.

23. An apparatus for making cartoon motion pictures comprising a camera, a frame for supporting a cartoon drawing in the field of the camera, a plurality of miniature background scene components arranged in spaced relation with respect to said cartoon supporting frame, means for supporting said frame in front of said components and between the same and said camera, and means for moving each of said components laterally and progressively in the same direction in the field of the camera, said moving means comprising a member pivoted about a point behind said scene components and extending toward the camera and operatively connected to said components, whereby pivotal movement of said member serves to move the forwardly disposed components a greater distance laterally of the camera than the rearwardly disposed components to give a changing lateral perspective effect.

MAX FLEISCHER.